W. SIVERD.
VEHICLE BRAKE.
APPLICATION FILED OCT. 23, 1908.
985,298.
Patented Feb. 28, 1911.
3 SHEETS—SHEET 2.
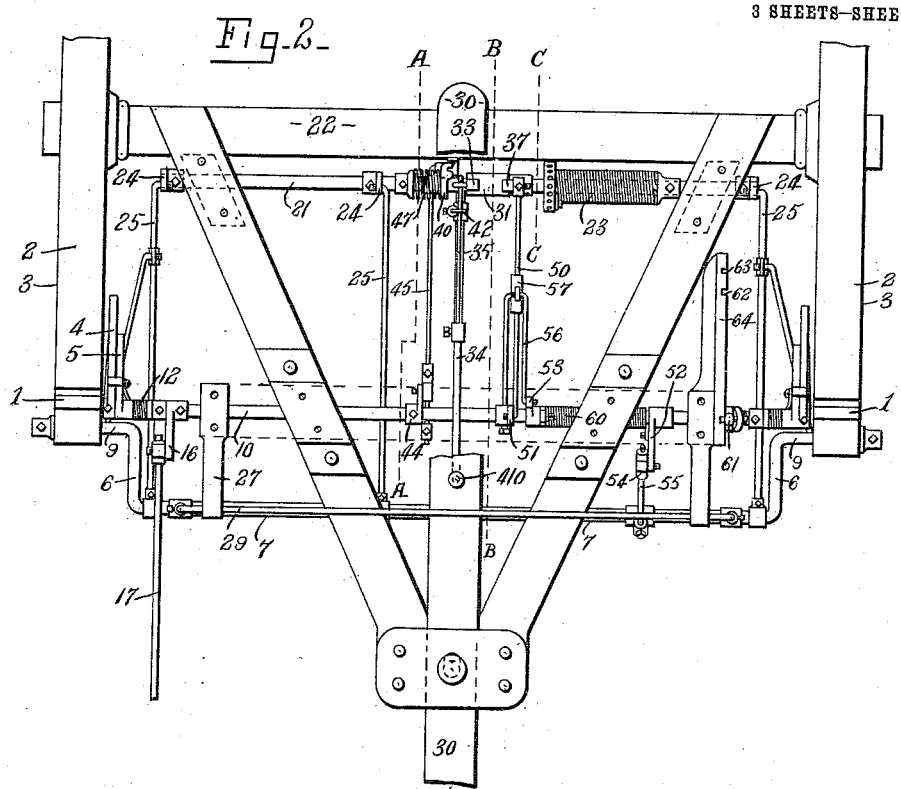
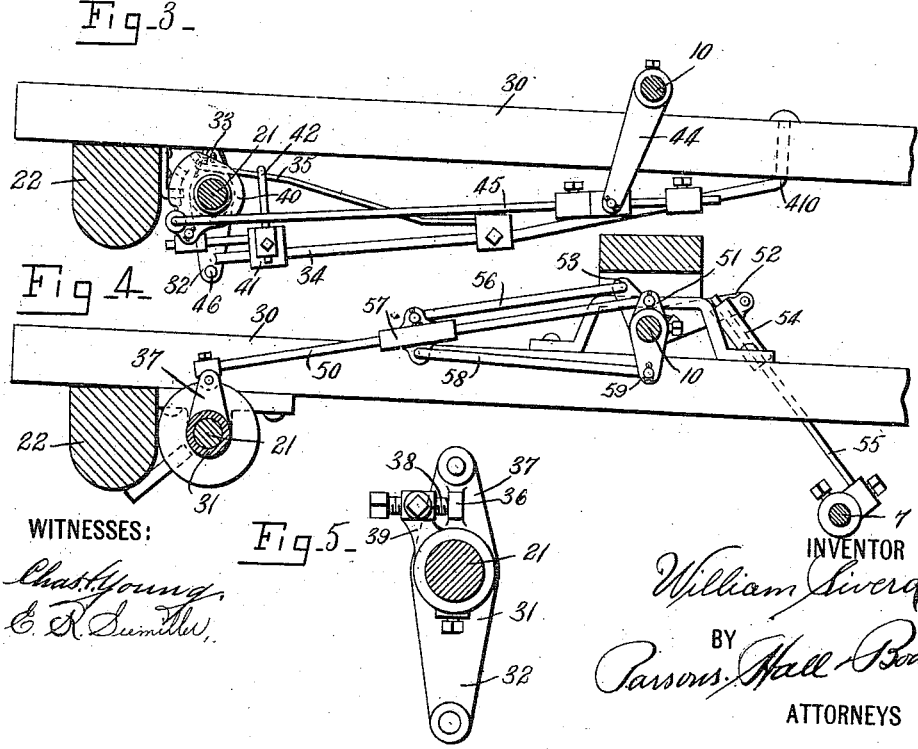
WITNESSES:
INVENTOR
William Siverd
BY
Parsons, Hall & Bodell
ATTORNEYS W. SIVERD.
VEHICLE BRAKE.
APPLICATION FILED OCT. 23, 1908.
985,298. Patented Feb. 28, 1911.
3 SHEETS—SHEET 3.
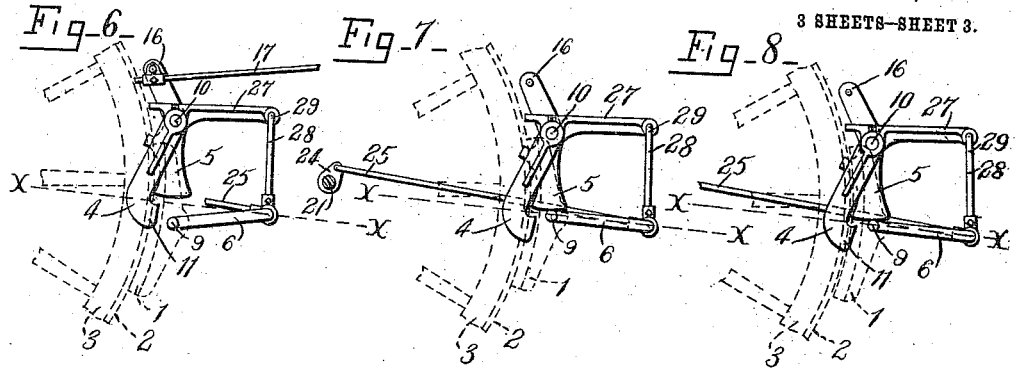
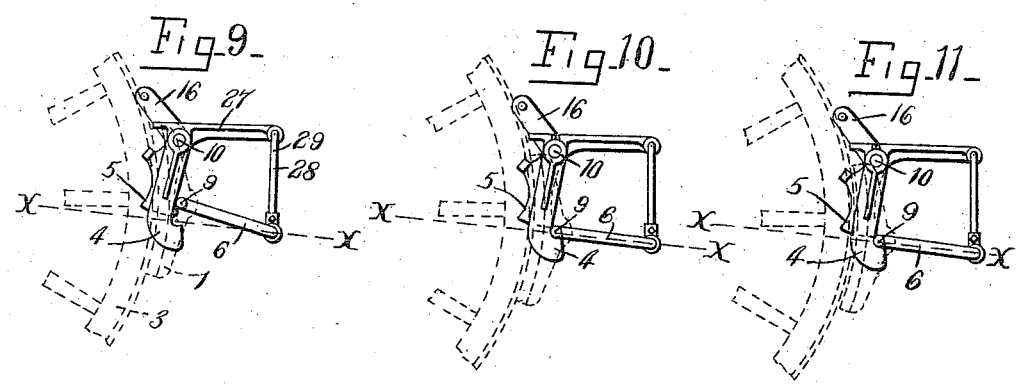
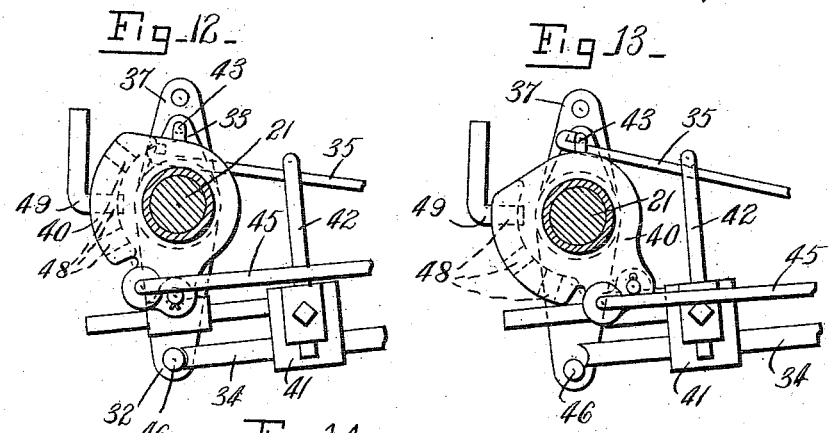
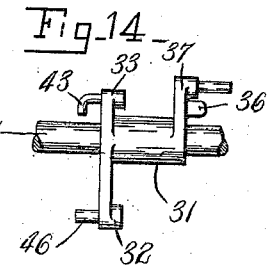
WITNESSES:
INVENTOR
William Siverd
BY
Parsons Hall Baker
ATTORNEYS

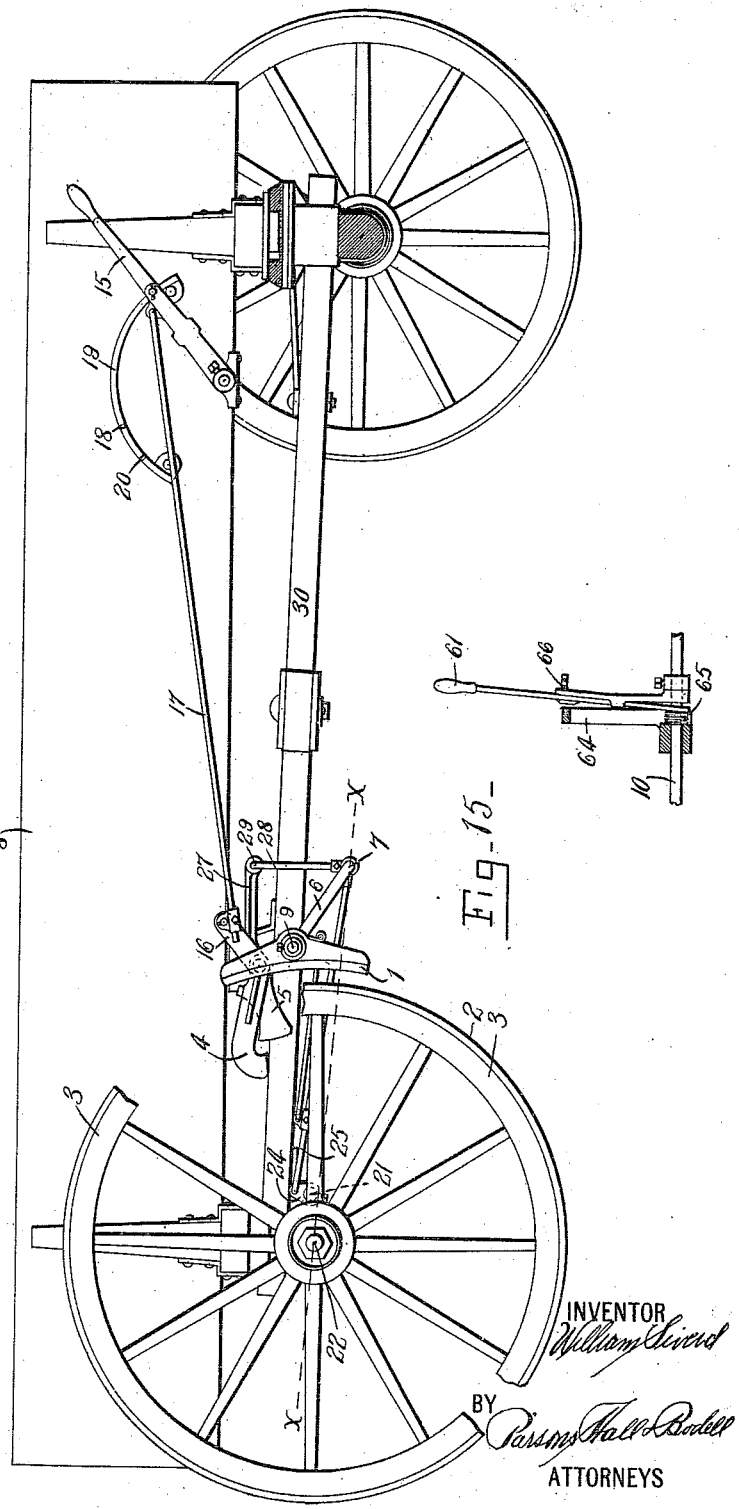

UNITED STATES PATENT OFFICE.

WILLIAM SIVERD, OF GENESEO, NEW YORK.

VEHICLE-BRAKE.

985,298.

Specification of Letters Patent. Patented Feb. 28, 1911.

Application filed October 23, 1908. Serial No. 459,118.

*To all whom it may concern:*

Be it known that I, WILLIAM SIVERD, of Geneseo, in the county of Livingston and State of New York, have invented a certain new and useful Vehicle-Brake, of which the following is a specification.

My invention has for its object the production of a braking mechanism for vehicles, which can be adjusted to act automatically; and it consists in the combinations and constructions hereinafter set forth and claimed.

In describing this invention reference is had to the accompanying drawing, in which like characters designate corresponding parts in all the views.

Figure 1 is a side elevation of one form of a wagon equipped with my braking mechanism. Fig. 2 is a plan, partly broken away, of the rear portion of the wagon, seen in Fig. 1, the box of the wagon being removed. Figs. 3 and 4 are sectional views, respectively, on line A—A and B—B Fig. 2, looking to the right. Fig. 5 is a sectional view on line C—C, Fig. 2, looking to the left. Figs. 6, 7, 8, 9, 10 and 11 are detail views illustrating the various positions assumed by parts of my braking mechanism. Figs. 12 and 13 are detail views partly in section of the controller and contiguous parts. Fig. 14 is a detail of the power transmitting part on the rear rock shaft. Fig. 15 is a sectional view through one of the hand levers.

This braking mechanism, as here illustrated, comprises, in its entirety, a shoe for coacting with a braking surface provided on a revoluble element, the shoe being normally out of position to engage the braking surface, and being shiftable into a position contiguous to the braking surface from which position it is movable by the movement of the revoluble element into a braking position when said element is revolving and the vehicle is traveling, in one direction, and the shoe being movable beyond the braking position into another position from which it is movable into its central braking position by the revoluble element when said element is revolving and the vehicle is traveling in the opposite direction. The braking mechanism also includes movable stops for holding the shoe from movement beyond its braking position in either direction, means for clamping the shoe on said braking surface when the shoe is held in braking position by one or the other of the stops, a draft-controlled member, and connections between the draft-controlled member and the clamping means and the shoe. Some of such connections are so arranged that the shoe is held off the braking surface when the vehicle and the draft-controlled member are being drawn forwardly and said shoe and stops have been placed to retard rotation of said element and the travel of the vehicle in a forward direction, and other of the connections between the draft-controlled member and the clamping means and the shoe are so arranged that the shoe is held off the braking surface when the shoe and stops are placed to retard rotation of said element and the travel of the vehicle in a backward direction, and the vehicle and draft-controlled member are being pushed backwardly. Such brake mechanism also includes manual means for shifting the shoe from its neutral or normal position into its first position in engagement with the braking surface and for positioning one or the other of the stops and also positioning said connections. It will be obvious however, to those skilled in the art, that some of the recited mechanisms or parts with their functions, may be dispensed with.

I have here illustrated my brake as embodied in a wagon having a reach, and the braking surface is preferably the periphery 2 of the rear wheel 3 of the wagon. It will be understood, however, that my braking mechanism may be embodied in any other type of wagon, and that the braking surface may be provided on any other revolving part of the vehicle.

There are, preferably, two sets of shoes 1 for coacting respectively with the peripheries 2 of both rear wheels 3, and of stops 4, 5, which are operated by one clamping mechanism, one draft member, and one manual controlling means. The shoes 1 are of any desirable form, size and construction, are carried, respectively, by suitable supports, as rearwardly extending crank arms 6 located at opposite ends of a rock shaft 7 extending transversely of the wagon beneath the central part of the box 8, these crank arms having studs or pivots 9 at their rear or free ends upon which the shoes 1 are mounted. The crank arms 6 are normally inclined upwardly and rearwardly, so that the shoes 1 are in their neutral position, that is separated a comparatively wide space from the peripheries 2 of the wheels 3, and the rock shaft 7 is movable about its axis for carrying the arms 6 downwardly and rearwardly in order to shift the shoes into engagement with the peripheries 2 of the wheels 3 from which points of engagement, the shoes will be carried by the rolling motion forwardly of the wheel 3 downwardly moving the pivot 9 in an arc into a straight line X—X passing through the axes of the wheel 3 and the rock shaft 7, then to the opposite side of said line into the position shown in Fig. 6; and said rock arms 6 and shoes 1 are movable from their position shown in Fig. 6, upwardly carrying the pivot into said straight line X—X, as shown in Figs. 7 and 8, by the movement of the wheel when turning backwardly.

The pairs of stops 4, 5 are mounted upon opposite ends of a rock shaft 10, extending parallel to, and in rear of the shaft 7. One stop 4 of each pair prevents the corresponding shoe from being carried downwardly after the pivot 9 is in the straight line X—X; and said stop 4 is formed with a hook shaped end 11, which hooks under the end of the stud or pivot 9, as shown in Figs. 9, 10 and 11. The stops 4 are rigidly mounted upon the rock shaft 10 and the full movement of the rock shaft carries the same into operative position as seen in Figs. 9, 10 and 11. The other stop 5 of each pair limits the movement of the corresponding shoe beyond said straight line X—X, from the position occupied by the shoe below said line, as seen in Fig. 6, and each stop 5 is loosely mounted on the shaft and is yieldingly connected thereto by a spring 12, coiled about the shaft 10 and connected at opposite ends respectively, to the shaft and to the stop 5. Each stop 5 is also provided with the stop or lug for engaging the fixed stop 4 and preventing said stop 5 from being displaced by the spring 12. A partial movement of the rock shaft 7 moves the stop 5 into operative position, as seen in Figs. 6, 7 and 8.

The movement of the rock shaft 10 is effected by means of a hand lever 15 connected to a rock arm 16, on said rock shaft 10 by a link 17, this lever 15 being movable from its starting position illustrated in Fig. 1 to the first notch 18 of a segment 19 for positioning the stop 5, and to the second notch 20 of said segment for moving the stop 4 into the position shown in Figs. 9, 10 and 11. The stops 5 are prevented from full movement with the rock shaft 10 by abutting against the rear side of the pivots 9, as is clearly seen in Figs. 9, 10 and 11, the spring 12 permitting said stops 5 to yield during further movement of the rock shaft. The movement of this hand lever 15 to either the first or second notches 18 and 20 also shifts the rock arms 6 carrying the shoes 1 into initial engagement with the braking surfaces 1 as shown in Fig. 9, this movement of the rock shaft 7, being effected by connections hereinafter described.

The means for clamping the shoes 1 on the braking surfaces 2 when the shoes 1 are in their central or braking position, that is when the pivots 9 are in said straight line X—X, as shown in Figs. 7, 8, 10 and 11, comprises a spring actuated rock shaft 21 located near the rear axle 22 and connected to the shoes 1 for moving the same substantially rectilinearly toward the braking surfaces 2, from the positions illustrated in Figs. 8 and 11 into the positions shown in Figs. 7 and 10. The spring 23 for actuating the rock shaft is normally under tension and acts to actuate the shaft 21 in one direction to clamp said shoes upon the surfaces 2. As here illustrated the rock shaft 21 is provided with rock arms 24 at its opposite ends and with a rock arm 24 intermediate at its ends, these rock arms 24 being connected by links 25 to the rock shaft 7 carrying the shoe supports 6. The rock shaft 7 is here shown as suspended from brackets 27 by the downturned ends 28 of a shaft 29 journaled in said brackets 27 and said shaft swings rearwardly as the shaft 21 is rocked by the spring 23.

In the illustrated embodiment of my invention the draft member is shown as the reach 30 which owing to the ordinary flexibility of a wagon, has a small sliding movement. It is obvious that when my brake is embodied in another type of wagon not having a reach, any other draft operated member may be provided.

The connections between the draft operated member 30 and the rock shaft 21, comprise a power-transmitting part 31 mounted on the rock shaft 21 and having oppositely-extending rock arms 32 and 33, a push rod 34 for coacting with one arm 32, and a pull rod 35 coacting with the other arm 33, one rod being in operative position while the other is out, and a controller for shifting, at will, either rod into operative position and the other rod out. The power-transmitting member 31 Fig. 14, is loosely mounted upon the shaft 21 but is connected thereto to transmit the motion to said shaft when the upper arm 33 moves forwardly and the lower arm 32, rearwardly by means of a shoulder 36 provided on a third arm 37, and said shoulder coacts with a set screw 38 at the end of a rock arm 39 fixedly mounted on the rock shaft 21. By means of the set screw 38 the positions of the arms can be easily adjusted to their most efficient position.

The controller is a rocking element 40 loosely mounted on the rock shaft 21 and carrying a shifter or slide 41 below the shaft 21, said shifter supporting the rear end of the push rod 34 which is connected at 410 to the draft operated element 30, and being also connected by an arm 42 to the pull rod 35 for controlling the movement thereof into and out of engagement with the pin 43 on the arm 33. The controller is connected to a rock arm 44 on the rock shaft 10 by a link 45, so that the movement of the hand lever 15 is transmitted directly to the controller and when said hand lever 15 is in its forward position the controller occupies the position shown in Fig. 3, in which the push rod 34 is raised above the pin 46 on the arm 32, and the pull rod is arranged below the pin 43 on the arm 33, so that the movement of the reach 30 in either direction is of no effect. When the lever is moved to the first notch 18 of the segment 19 the controller is moved into the position illustrated in Fig. 12, in which the push rod 34 is in position to engage the pin 46 on the arm 32, so that rearward movement of the reach will cause the shaft 21 to be rocked, taking the brake shoes 1 off the braking surface 2, that is moving the shoes out from the position indicated in Fig. 7, into the position indicated in Fig. 8. When the hand lever is moved to the last notch 20 of the segment 19 the controller occupies the position shown in Fig. 13, and the push rod 34 is above said pin 46 of the rock arm 32 and the pull rod 35 in position to hook back of the pin 43 of the arm 33. Thus the brake shoes and stops having been set by the movement of the lever 15 to the last notch, in the position shown in Figs. 10 and 11, the movement of the reach forwardly will move the brake shoes 1 from the position shown in Fig. 10 to that shown in Fig. 11. This controller is movable slightly laterally on the shaft 21 against the action of the spring 47 and is provided with sockets 48 which receive a fixed stop 49 on the rear axle. As the controller is oscillated it is forced laterally, by the fixed stop 49 as said controller shifts one socket off said stop, and another socket into engagement therewith. The shaft 10 is also connected to the shaft 21 in order that the movement of the hand lever may be facilitated by the spring 23 during its movement and said shaft 10 is also connected to the shaft 7 in order to transmit the movement of the hand lever 15 thereto, for moving the shoes from the position shown in Fig. 1 to that indicated in Fig. 9. This former connection consists of a link 50 connecting the rock arm 51 on the shaft 10, and a third rock arm 37 on the power-transmitting member 31. The movement of the shaft 10 by the hand lever tending to rock the shaft 21 through these connections in the same direction in which spring 23 rocks said shaft, thus the hand lever when released will be pulled back by the spring 23.

The connections between the shaft 10 and the shaft 7 supporting the shoes 3, comprise rock arms 52, 53 loosely mounted on the shaft 10 and spaced apart thereon, one rock arm as 52, having a sleeve 54 pivoted thereto which slidably receives a rock arm 55 mounted on and rigid with the shaft 7, and the other arm 53 being connected by a link 56 to a sleeve 57 sliding on the link 50, this sleeve 57 being also connected by a link 58 to a rock arm 59 fixed on the rock shaft 10. A spring 60 coiled about the rock shaft 10 is connected at its ends to the arms 52 and 53, forming a yielding connection between said arms. The operation of these connections is as follows: When the shaft 10 is rocked by the hand lever 15 for positioning the stops 43, the shaft 7 must be revolved in the reverse direction in order to carry the shoes 1 upon the braking surface 2; and during the rocking of the shaft 10 the rock arm 59 moves the sleeve 57 rearwardly and the sleeve 57 through the medium of the link 56 moves the arm 53 rearwardly, which, through the yielding connection 60 moves the arm 52 downwardly rocking the shaft 7. The spring 60 is not normally under tension and serves to support the shoes in their normal position, and also to return the shoes to the position indicated in Fig. 1. The shaft 10 may also be provided with a hand lever 61 similar to the hand lever 15 in order that when the box 8 is removed from the bolsters of the wagon, and the lever 15 and a link 17 removed therewith, the brake may be operated by means of this supplemental hand lever. When the supplemental hand lever is not in use, it may be held out of position to enter notches 62, 63 in the segment 64 by swinging its upper end laterally away from the segment, against the spring 65 Fig. 15, Sheet 1 pressing on the lower end of the lever, and holding it in this lateral position by suitable means as a pin 66 which enters holes in a laterally extending lug on the segment.

The operation of my brake is as follows: When in going up hill it is desirable to adjust the shoes to prevent the vehicle from going backwardly down the hill, the lever 15 is set in the first notch 18 moving the shoes into engagement with the braking surfaces 1 above the line X—X, from which position said shoes are carried by the forward rotation of the wheels into the position shown in Fig 6; this movement of the lever to the first notch 18 places the stops 5 in the position shown in Fig. 6. If the wagon should stop on the hill and start to settle back, the rotation of the wheels would carry the shoes from the position shown in Fig. 6 into the position shown in Fig. 8, and since there is no movement of the reach 30, during this setting back, the shaft 21 is rocked by the spring 23 clamping the shoes upon the surfaces 2. However should it be desirable to back the wagon down the hill or toward the side of the road, the backward push of the team slides the reach 30 and push rod 34 backwardly (the latter having been placed in the position shown in Fig. 12 by the movement of the hand lever 15 to the first notch) and thereby rocking the shaft 21 against the action of the spring, carrying the shoes slightly off the braking surface 2, Fig. 8. When going down hill the lever 15 is set in the last notch 20 setting the shoes and stops 4 in the positions shown in Fig. 9, and shifting the pull and push rods 34 and 35 into the positions shown in Figs. 3 and 13. When the wagon is drawn forwardly and the reach also pulled slightly, the shoes are carried by the rolling forward of the wheel into the position indicated in Fig. 10 from which position they are moved into the position shown in Fig. 11 by the movement of the reach 30. When it is desired to restrain the wagon from being pushed backwardly, the lever 15 is set in the first notch 19 after the reach 30 has been pushed rearwardly and has carried the end of push rod 34 in rear of the pin 46 on the arm 32, so that the movement of the reach is ineffective to rock the shaft 21 against the spring 23 and hold the shoes 1 off the braking surfaces. When the shoes are so adjusted and the wagon is backed said shoes will be carried automatically from their positions illustrated in Fig. 6 into braking position, Fig. 7, and will also be carried automatically out of braking position when the wagon is again drawn forwardly. When it is necessary to retard the wagon from being drawn forwardly, the lever 15 is set to the last notch 20 after the reach 30 has been drawn forwardly so that the hooked end of the pull rod 35 is in front of the pin 43 of the arm 33 and therefore can not rock the shaft 21 against the spring 23 to hold the shoes 1 off the braking surfaces. If when the brake shoes 1 are so adjusted the wagon is backed, the shoes will be carried automatically out of braking position by the backward rotation of the wheels.

The construction and operation of my braking mechanism will now be understood upon reference to the foregoing description in the accompanying drawing.

What I claim is:—

1. In a vehicle, a revoluble element having a braking surface, and braking mechanism comprising a member for engaging, and being carried by, said surface into braking position when said surface and element revolves, and the vehicle moves, in one direction, and said member being moved by said surface when said element revolves and the vehicle moves, in the reverse direction, and means operable to reverse the operation of the said member, so that said member will be carried out of braking position when the braking surface is moving in said one direction and into braking position when the braking surface is moving in the reverse direction, substantially as and for the purpose specified.

2. In a vehicle, a revolving element having a braking surface, and braking mechanism comprising a shoe movable from either side of braking position into braking position by the movement of the revolving element, stops for limiting the movement of the shoe beyond the braking position, respectively, from the positions assumed by the shoe on opposite sides of the braking position, and means for positioning the stops, substantially as and for the purpose set forth.

3. In a vehicle, a revolving element having a braking surface, and braking mechanism comprising a shoe movable from either side of a central braking position into braking position by the movement of the revolving element, a rock shaft, rock arms on said shaft, one being fixed thereon, and the other being yieldingly mounted thereon, the rock arms serving as stops for limiting the movement of the shoe into braking position, respectively, from positions on opposite sides of the braking position, and means for rocking said rock shaft different amounts for positioning the stops, substantially as and for the purpose described.

4. In a vehicle, a revolving element having a braking surface, and braking mechanism comprising a shoe movable from one side of its operative or braking position into braking position, means for supporting the shoe, means for limiting the movement of the shoe and its supporting means in braking position, the limiting means comprising a rock shaft, a rock arm on the rock shaft, and means for rocking said shaft for moving the rock arm into position to limit the brake shoe, substantially as and for the purpose specified.

5. In a vehicle, a revolving element having a braking surface, and braking mechanism comprising a rocking support, a shoe for engaging said surface, carried by said support, and movable by engagement with said surface from either side of braking position into such position by the movement of the revolving element, a rock shaft, rock arms on said rock shaft, one being fixed thereon and the other yieldingly mounted thereon, the rock arms serving as stops for limiting the movement of the shoe in braking position, respectively, from positions on opposite sides of braking position, and means for rocking said rock shaft different amounts for positioning the stops, substantially as and for the purpose specified.

6. In a vehicle, a revolving element formed with a braking surface, and a braking mechanism comprising a rocking support, a shoe for engaging said surface, pivoted to the support and normally out of engagement with the braking surface, the pivot connecting the shoe and the support being normally arranged on one side of a straight line passing through the axes of said element and the support, and the support being movable for shifting the shoe into engagement with said surface, and the support and shoe being then movable by the movement of the revolving element for carrying said pivot toward said line, a stop for limiting the movement of the shoe by said element, and manual means for rocking the support and thereby positioning the shoe in position to be initially engaged by the braking surface, substantially as and for the purpose set forth.

7. In a vehicle, a revolving element formed with a braking surface, and braking mechanism comprising a rocking support, a shoe for engaging said surface, pivoted to the support and normally out of engagement with a braking surface, the pivot connecting the shoe and support being normally arranged at one side of a straight line passing through the axes of said element and the support and the support being movable for shifting the shoe into engagement with said surface, and the support and shoe being then movable into braking position by the movement of the revolving element, carrying the pivot into said line, and to the opposite side of said line, a stop for limiting the movement of the shoe, in one direction when said pivot is located in said line, a second stop for limiting the movement of the shoe in the opposite direction when said shoe has been previously moved to the opposite side of said line and the movement of the revolving element and the vehicle is reversed, thereby carrying the pivot into said line, and manual means for controlling the movement of the shoe from its normal position into position to be initially engaged by the braking surface, and for positioning the stops, substantially as and for the purpose described.

8. In a vehicle, a revolving element formed with a braking surface, and a braking mechanism comprising a rock arm, a shoe for engaging said surface, pivoted to the free end of said arm and being normally out of engagement with the braking surface, the pivot connecting the shoe and the rock arm being normally arranged at one side of a straight line passing through the axes of said element and the rock arm, and the rock arm being movable for shifting the shoe into engagement with said surface, and the arm and shoe being then movable into braking position by the movement of the revolving element, carrying said pivot toward said line, a stop for limiting the movement of the rock arm and shoe by said element, and manual means for initially actuating the rock arm, substantially as and for the purpose specified.

9. In a vehicle, a revolving element formed with a braking surface, and a braking mechanism comprising a rocking support, a shoe for engaging said surface, pivoted to the support and being normally out of engagement with the braking surface, the pivot connecting the shoe and support being normally arranged at one side of a straight line passing through the axes of said element and the shoe support, and the support being movable for shifting the shoe into engagement with said surface, and the support and shoe being then movable into braking position by the movement of the revolving element, a rock shaft and a stop mounted on and movable by the rock shaft into and out of position for limiting the movement of the shoe with said element, and manual means for rocking the support and thereby positioning the shoe in position to be initially engaged by the braking surface, and for rocking said shaft, substantially as and for the purpose set forth.

10. In a vehicle, a revolving element formed with a braking surface, and a braking mechanism comprising a rock arm, a shoe pivoted to the free end of said arm and normally arranged out of engagement with the braking surface, the pivot connecting the shoe and rock arm being normally arranged at one side of a straight line passing through the axes of said element and the rock arm, and the rock arm being movable for shifting the shoe into engagement with said surface, and the rock arm and shoe being then movable into braking position by the movement of the revolving element, carrying said pivot into said line and then to the opposite side of said line, a stop for limiting the movement of the shoe and rock arm in one direction when said pivot is located in said line and the element revolves and the vehicle moves in one direction, a second stop for limiting the movement of the shoe in the opposite direction when the pivot is in said line, and the shoe has moved from its position occupied when the pivot of said shoe is on the opposite side of said line and the element revolves and the vehicle moves in the reverse direction, and manual means for controlling the movement of the rock arm from its normal position into a position in which the shoe is first engaged by the braking surface, and for also rocking said shaft and positioning the stops, substantially as and for the purpose described.

11. In a vehicle, a revolving element formed with a braking surface, and a braking mechanism comprising a rock arm, a shoe pivoted to the free end of said arm and normally arranged out of engagement with the braking surface, the pivot connecting the shoe and rock arm being normally arranged at one side of a straight line passing through the axes of said element and the rock arm, the rock arm being movable for shifting the shoe into engagement with said surface, and the rock arm and shoe being then movable into braking position by the movement of the revolving element, carrying said pivot into said line and then to the opposite side of said line, a rock shaft, a pair of stops carried by the rock shaft, one stop serving to limit the movement of the shoe and rock arm in one direction when said pivot is located in said line, and the element revolves and the vehicle moves in one direction, and the other stop serving to limit the movement of the support and shoe into braking position from the position occupied when said pivot is on the opposite side of said line and the element revolves and the vehicle moves in the opposite direction, and manual means for rocking the first-mentioned rock arm and shifting the shoe out of its normal position into position to be initially engaged by the braking surface, and for rocking said shaft to position the stops, substantially as and for the purpose specified.

12. In a vehicle, a revolving element formed with a braking surface, and a braking mechanism comprising a rock arm, a shoe pivoted to the free end of said arm and normally arranged out of engagement with the braking surface, the pivot connecting the shoe and rock arms being normally arranged at one side of a straight line passing through the axes of said element and the rock arm, the rock arm being movable for shifting the shoe into engagement with said surface, and the rock arm and shoe being then movable into braking position by the movement of the revolving element, carrying said pivot into said line and then to the opposite side of said line, a rock shaft, a pair of stops carried by the rock shaft, one stop serving to limit the movement of the shoe and rock arm in one direction when said pivot is located in said line, and the element revolves and the vehicle moves in one direction, and the other stop being yieldingly mounted on the rock shaft, and serving to limit the movement of the support and shoe into braking position from the position occupied when said pivot is on the opposite side of said line and the element revolves and the vehicle moves in the opposite direction and manual means for rocking the first mentioned rock arm and shifting the shoe out of its normal position into position to be initially engaged by the braking surface, and for rocking said shaft to position the stops, the manual means being movable a greater distance for positioning the fixed stop than when positioning the yielding stop, and the last mentioned stop yielding when the fixed stop is being positioned, substantially as and for the purpose set forth.

13. In a vehicle, a revoluble element having a braking surface, and a braking mechanism comprising a shoe for engaging said surface, means for holding the shoe against said surface, a draft-controlled member for holding the shoe off said surface, and a connection between the draft-controlled member and the said means, said connection being operable by the draft-controlled member and shiftable into and out of position to be operated by said member, and manual means for shifting said connection into and out of position to be operated on by the draft-controlled member, substantially as and for the purpose specified.

14. In a vehicle, a revolving element having a braking surface, and a braking mechanism comprising a shoe for engaging said surface and being normally out of engagement therewith, means for holding the shoe against said surface, a movable draft-controlled member for holding the shoe off said surface, shiftable connections between said member and said means whereby the shoe is held off said surface when the draft member is moved in opposite directions, and the vehicle is traveling either forwardly or rearwardly, and manual means for controlling the positioning of the shoe to hold the vehicle from forward or reverse movement and for shifting said connections to either hold the shoe off said surface when the shoe is adjusted to prevent forward movement and the vehicle is drawn forwardly, or to hold the shoe off said surface when the shoe is adjusted to prevent backward movement and the vehicle and draft member are being pushed rearwardly, substantially as and for the purpose set forth.

15. In a vehicle, a revoluble element having a braking surface, and a braking mechanism comprising a shoe for engaging said surface and being normally out of engagement therewith, means for holding the shoe against said surface when the shoe is in braking position, a draft-controlled member for holding the shoe off said surface, a connection between the draft-controlled member and the said means, said connection being shiftable into and out of operative position, and manual means for controlling the movement of the shoe into and out of braking position and for shifting said connection, the manual means being also operable for moving the shoe into position against said surface without shifting the said connection into operative position, substantially as and for the purpose described.

16. In a vehicle, a revoluble element having a braking surface, and a braking mechanism comprising a shoe for engaging said surface, means for holding the shoe against said surface comprising a rock shaft, a spring for moving the rock shaft in one direction, rock arms associated with the rock shaft and extending in opposite directions therefrom, a draft-controlled member, shiftable connections between the rock arms and the draft-controlled member whereby the rock shaft is moved in the same direction by the draft-controlled member whether the said member is moving in one direction or in the reverse direction, and manual means for shifting said connections, substantially as and for the purpose set forth.

17. In a vehicle, a revoluble element having a braking surface, and a braking mechanism comprising a shoe for engaging said surface, means for holding the shoe against said surface comprising a rock shaft, a spring for moving the rock shaft in one direction, and rock arms associated with the rock shaft and extending in opposite directions therefrom, a draft-controlled member, shiftable push and pull rods, connected to the draft-controlled member and coöperating respectively with said rock arms, and manual means for shifting either of said rods into operative position and the other out of such position, substantially as and for the purpose described.

18. In a vehicle, a revoluble element having a braking surface, and a braking mechanism comprising a shoe for engaging said surface, means for holding the shoe against said surface comprising a rock shaft, a spring for moving the rock shaft in one direction, and rock arms associated with the rock shaft and extending in opposite directions therefrom, a draft-controlled member, shiftable push and pull rods connected to the draft-controlled member and coöperating respectively with said rock arms, and an oscillating controller connected to said rods for shifting either into operative position and the other out of such position, substantially as and for the purpose specified.

19. In a vehicle, a revoluble element having a braking surface, and a braking mechanism comprising a shoe for engaging said surface, means for holding the shoe against said surface comprising a rock shaft, a spring for moving the rock shaft in one direction, and rock arms associated with the rock shaft and extending in opposite directions therefrom, a draft-controlled member, shiftable push and pull rods connected to the draft-controlled member and coöperating respectively with said rock arms, an oscillating controller loosely mounted on the rock shaft and having a shifter connected to said rods, and movable toward and from the axis of the rock shaft during the movement of the controller for carrying either rod into operative position and the other out of such position, and manual means for operating the controller, substantially as and for the purpose set forth.

20. In a vehicle, a revoluble element having a braking surface, and braking mechanism comprising a rocking support, a shoe for engaging said surface carried by the support and being normally out of engagement with the braking surface, means for carrying the support in order that the support and shoe may be moved toward and from the braking surface, the support rocking toward said surface for carrying the shoe into engagement therewith, and said means being movable for permitting the shoe and the support therefor to be moved substantially rectilinearly toward said surface, means for rocking the support to carry the shoe toward the braking surface, and means for moving the shoe and support therefor rectilinearly against said surface, substantially as and for the purpose specified.

21. In a vehicle, a revoluble element having a braking surface, and a braking mechanism comprising a rocking support and shoe for engaging said surface carried by the support and being normally out of engagement with the braking surface, the support rocking toward said surface for carrying the shoe into engagement therewith and the shoe being movable rectilinearly toward said surface, means for rocking the support to carry the shoe toward the braking surface, and means for moving the shoe rectilinearly against said surface, the latter means comprising a rock shaft, a spring for actuating the shaft in one direction to clamp the shoe on the braking surface, and connections between the rock shaft and the shoe, substantially as and for the purpose specified.

22. In a vehicle, a revolving element formed with a braking surface, and a braking mechanism comprising a shaft having a rock arm thereon, a shoe for engaging said surface, carried at the free end of the rock arm, the shoe being normally out of engagement with the braking surface, and the end of the rock arm being normally arranged on one side of a straight line passing through the axes of said element of said rock shaft, and the rock arm being movable about its axis for carrying the shoe into initial engagement with said surface whereby the shoe is carried into braking position by the movement of the revolving element and the end of the rock arm carried into said line, and means for moving the shoe rectilinearly and clamping the shoe on said surface, substantially as and for the purpose set forth.

23. In a vehicle, revolving elements formed with a braking surface and braking mechanism comprising a rock shaft having a rock arm thereon, the rock shaft being movable laterally relatively to its axis, a shoe for coacting with said surface, pivoted to the free end of the rock arm, the shoe being normally out of engagement with the braking surface, and the pivot connecting the shoe and the rock arm being normally arranged at one side of a straight line passing through the axes of said element and the rock shaft, and the rock arm being movable for carrying the shoe into initial engagement with said surface and the shoe being movable into braking position by the movement of the revolving element carrying the pivot into said line, and then beyond braking position carrying the pivot to the opposite side of said line, a movable stop for limiting the movement of the shoe in one direction when said pivot is located in said line, a second movable stop for limiting the movement of the shoe in the opposite direction when said pivot has been previously moved to the opposite side of said line and the movement of the revolving element and the vehicle is reversed, thereby carrying the pivot in a reverse direction into said line, means for moving the rock shaft laterally for clamping the shoe on said surface, and manual means for moving the rock arm about its axis from its normal position and also for positioning the stops, substantially as and for the purpose described.

24. In a vehicle, a revoluble element having a braking surface, and a braking mechanism comprising a swinging shaft having a rock arm thereon, a shoe for coöperating with said surface pivoted to the end of the rock arm, the shoe being normally out of engagement with the braking surface, and the rock arm being movable on its axis for carrying the shoe into engagement with the braking surface into a position in which the pivot connecting the shoe and rock arm is normally arranged on one side of a straight line passing through the axes of the revolving element and shaft, and the shoe being movable by the movement of the revolving element carrying the pivot into said line and to the opposite side of said line, a rock shaft, a pair of stops mounted on the rock shaft and movable thereby into position to limit the movement of the shoe by the revolving element in opposite directions when the pivot is in said line, a third rock shaft arranged parallel to the former rock shaft having rock arms connected to the swinging rock shaft, a spring associated with the third rock shaft and acting to move the same to clamp the shoe upon the braking surface, oppositely-extending rock arms provided on the third rock shaft, a draft operated member, push and pull rods connected to the draft-controlled member, said rods coöperating respectively with the oppositely-extending rock arms, an oscillating controller loosely mounted on the third rock shaft and having a shifter associated therewith for moving either of said rods into operative position with the corresponding rock arm and the other rod out of position with the other rock arm, and a hand lever connected to said rock shafts and to the controller, substantially as and for the purpose specified.

25. In a vehicle, revoluble elements having braking surfaces and braking mechanism comprising three rock shafts extending transversely of the wagon, and located respectively beneath the central portion of the wagon, near the rear axle, and between the central portion and rear axle, the forward shaft being movable laterally relatively to its axis and having rearwardly and upwardly extending rock arms at its opposite ends, shoes for engaging the braking surfaces pivoted to the free ends of said rock arms, the rock arms being normally arranged in position to hold the shoes out of engagement with the braking surface, and the forward shaft being movable on its axis for carrying each shoe into initial engagement with the corresponding braking surface into a position in which the pivot connecting the shoe and the rock arm is normally arranged on one side of a straight line passing through the axes of the revolving element and shaft, and said forward shaft and shoe being movable by the movement of the revolving elements carrying the pivot of each shoe into said line and to the opposite sides of said line, a pair of stops mounted on each end of the central rock shaft, and movable thereby into position to limit the movement of the shoes by the revolving element in opposite directions when the pivots are in said lines, and the rear rock shaft having rock arms at its ends connected to the forward rock shaft, a spring tending to turn the rear rock shaft in one direction, oppositely-extending rock arms associated with the third shaft, a draft-controlled member, push and pull rods connected to the draft-controlled member and coöperating respectively with the oppositely-extending rock arms on the rear shaft, an oscillating controller mounted on the rear shaft and having a shifter connected to the push and pull rods for moving either of said rods into operative position and the other out, a hand lever connected to the central shaft, and connections between the central shaft and the front and the rear shafts, substantially as and for the purpose set forth.

26. In a vehicle, a revoluble element having a braking surface and braking mechanism comprising a shoe for coacting with the braking surface, means for controlling the operation of the shoe comprising a rocking shaft extending crosswise of the wagon body, and having means for coacting with the shoe, a lever loosely mounted on the rock shaft and movable axially thereon, means for connecting and disconnecting the lever and the rock shaft operable during the axial movement thereof, a second operating lever located near the front of the wagon, and means connecting the latter lever to the rock shaft, substantially as and for the purpose set forth.

In testimony whereof, I have hereunto signed my name in the presence of two attesting witnesses, at Geneseo, in the county of Livingston, in the State of New York, this 12th day of October, 1908.

WILLIAM SIVERD.

Witnesses:
T. C. REAGAN,
JOHN B. ABBOTT.

Copies of this patent may be obtained for five cents each, by addressing the "Commissioner of Patents, Washington, D. C."